Oct. 24, 1950     W. C. HAHN     2,527,215
POSITION-TYPE TELEMETER TRANSMITTER
Filed Aug. 18, 1948

Inventor:
William C. Hahn,
by Richard E. Hosley
His Attorney.

Patented Oct. 24, 1950

2,527,215

UNITED STATES PATENT OFFICE 2,527,215

POSITION-TYPE TELEMETER TRANSMITTER

William C. Hahn, Scotia, N. Y., assignor to General Electric Company, a corporation of New York Application August 18, 1948, Serial No. 44,821

6 Claims. (Cl. 178—44)

This invention relates to an improved position-type telemeter transmitter and has for an object the provision of such a transmitter which is characterized by its ruggedness, low input torque, and simplicity of construction. Other objects and advantages will appear as the description proceeds.

Figure 1:
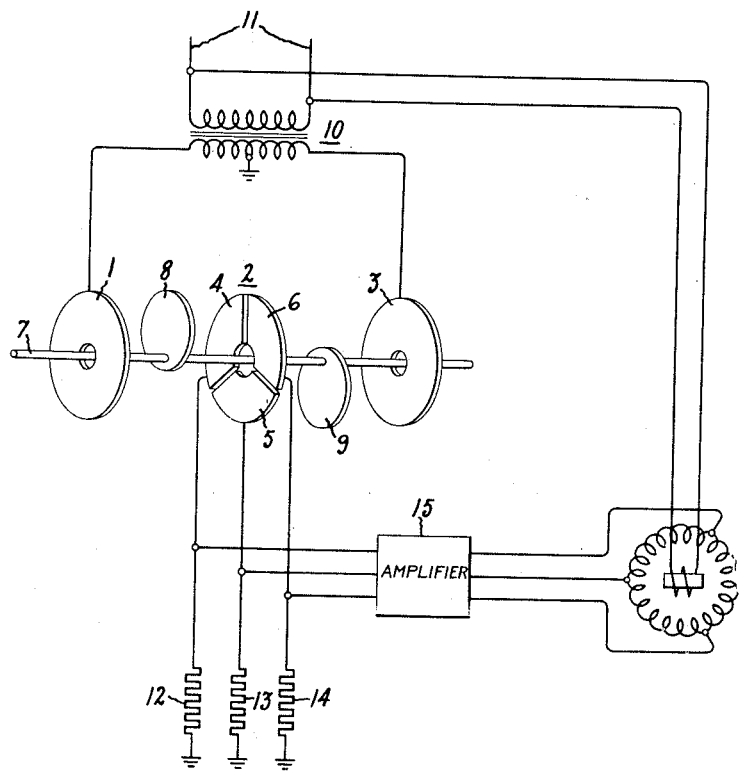
Figures 2, 3:
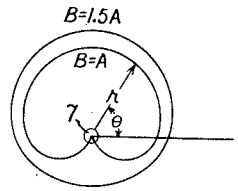

The features of the invention which are believed to be novel and patentable are pointed out in the claims forming a part of this specification. For a better understanding of the invention, reference is made in the following description to the accompanying drawing in which Fig. 1 is a schematic illustration of the improved transmitter connected in a position-type telemetering system; Fig. 2 is a view, partly in cross section, showing a preferred construction of the transmitter; and Fig. 3 is a diagram illustrating design of the dielectric members 8 and 9, Fig. 1. Where the same part appears in more than one figure of the drawing, it is always represented by the same reference number.

Referring now to Fig. 1, the transmitter includes three, preferably stationary and parallel, electrically-conducting plates 1, 2, and 3. In this figure the spacing between the plates has been exaggerated to more clearly illustrate their construction. Plate 2 is divided into three equal sectors 4, 5, and 6, each of which is insulated from the others, for example by air gaps.

A rotatable shaft 7 is positioned normal to the three plates and passes through their centers. Eccentrically attached to the shaft are two dielectric members 8 and 9. Preferred shapes for these members are discussed hereinafter. Member 8 is attached to the shaft between plates 1 and 2, and member 9 is attached to the shaft between plates 2 and 3. The major portions of members 8 and 9 respectively are on opposite sides of the axis of the shaft, as shown in the drawing.

A transformer 10, energized by connections 11 from a suitable alternating current source, is connected to apply an alternating voltage between the outer plates 1 and 3. The capacitances between plate 1 and each sector of plate 2, and the capacitances between plate 3 and each sector of plate 2, form a plurality of capacitance voltage dividers; so that the A.-C. potential of each sector of plate 2 is an intermediate value between the potential of plate 1 and the potential of plate 3.

Preferably, plates 1 and 3 have the same size and shape, and are equally spaced from plate 2. Therefore, if the dielectric between plates were uniform, the capacitance from each sector of plate 2 to plate 1 would be the same as the capacitance from that sector to plate 3, and all three sectors of plate 2 would remain at neutral A.-C. potential. However, due to the presence of eccentrically mounted members 8 and 9, the dielectric between the plates is not uniform. For example, dielectric member 9 in the position shown in Fig. 1 increases the capacitance between sector 5 and plate 3, so that this capacitance is greater than the capacitance between sector 5 and plate 1. The potential of sector 5 is thus shifted in value toward the potential of plate 3. In a similar manner, due to the presence of dielectric member 8 in the position shown, the potentials of sectors 4 and 6 are shifted toward the potential of plate 1. Since an alternating voltage is applied between plates 1 and 3, alternating potentials are present on each sector of plate 2; and the potential on sector 5 is in phase opposition to the potentials on sectors 4 and 6.

It is evident that as shaft 7 is rotated, the relative magnitudes and phases of the sector potentials change; and accordingly, respective values of the potentials correspond to given positions of the shaft. These potentials produce corresponding voltages across resistors 12, 13, and 14 which are respectively connected to sectors 4, 5 and 6. An important advantage of this transmitter compared to electro-dynamic transmitters is that an extremely small torque is required to rotate shaft 7.

The voltages across resistors 12, 13, and 14 are amplified by amplifier 15, which may be a conventional vacuum tube or other voltage amplifier; and the amplified voltages are applied to energize the stator winding of a conventional three sectional position-type telemeter receiver 16. The rotor winding on receiver 16 is connected in parallel with the primary of transformer 10, and thus is energized in phase with the voltage between plates 1 and 3. As is well known, the rotor of such a receiver assumes a position which depends upon the relative amplitudes and phase of the respective voltages applied to the three input connections of its stator. Since these are a function of the rotational position of shaft 7 as hereinbefore explained, the rotor of receiver 16 assumes a position which corresponds to the position of shaft 7.

Refer now to Fig. 2, which shows the details of construction of a transmitter of the type described. Plates 1, 2, and 3 are held in their proper relative positions by a ring of insulating material 17. To facilitate assembly, ring 17 may be made up of two or more sections. Surrounding the assembly is a case 18 and two end bells 19. The assembly may be held together by screws 20 or other suitable means. Shaft 7 is supported on bearing surfaces 21 of the two end bells, as shown.

To obtain the best coincidence between the position of the receiver rotor and the position of shaft 7, and to minimize space harmonies, the potential of each sector should vary sinusoidally as shaft 7 rotates uniformly. This sinusoidal relationship can be obtained by making the sectors equal, and shaping the dielectric members substantially according to the polar coordinates equation $r^2 = A \sin \theta + B$, where $r$ is the radius from the center of shaft 7 to the edge of the dielectric member corresponding to a given angle $\theta$ from an arbitrary reference axis, and A and B are constants selected to that $\sqrt{B+A}$ equals the maximum radius desired and $\sqrt{B-A}$ equals the minimum radius. Curves illustrating shapes of the dielectric members where $B=A$ and $B=1.5A$ are shown in Fig. 3. These shapes are only approximately correct because of fringing effects at the edges of the plates and the dielectric. Exact shapes for optimum results in any particular case can best be determined experimentally, starting with shapes calculated in the manner described as a first approximation and using "cut and try" techniques to determine the final shape.

Other shapes for the dielectric members may be used to provide non-sinusoidal variation of the sector potentials with uniform rotation of shaft 7. In each such case the dielectric members are designed substantially according to an equation expressing the desired relationship. Such non-sinusoidal variations may be utilized when it is desired that the receiver rotor not maintain exact coincidence with shaft 7; but that it rotate faster over parts of its range than over others, to provide an expanded scale over a portion of the range.

The most important space harmonics to be eliminated are the third and fifth. Harmonics of higher order, and all the even harmonics, are usually sufficiently small to cause little difficulty. The third space harmonic is balanced out by dividing plate 2 into three equal sectors to provide a "three-phase" output, as in the preferred embodiment described. The fifth space harmonic can be suppressed by making each sector 4, 5, and 6 cover an angle of 72 degrees, leaving a gap of 48 degrees between adjacent sectors. Since the 72 degree covered by a sector is exactly one full cycle of the fifth space harmonic, this harmonic is not generated.

Although the transmitter illustrated in the drawing is the preferred embodiment, the principles of the invention permit various alterations in the apparatus. For example, only one eccentrically mounted dielectric member is essential, but two members, as shown, provide larger output voltages. Also, plate 2 can be divided into various numbers of sectors.

Having described the principle of this invention and the best mode in which I have contemplated applying that principle, I wish it to be understood that the apparatus described is illustrative only, and that other means can be employed without departing from the true scope of the invention defined by the following claims.

What I claim as new and desire to secure by Letters Patent of the United States is:

1. A position-type telemeter transmitter comprising three parallel electrically-conducting plates of which the center plate is divided into a plurality of sectors each insulated from the others, at least one dielectric member between an outer plate and the center plate, said dielectric member being eccentric to a line perpendicular to the center of the center plate, means to produce relative rotation of said center plate and said dielectric member about said line, means to apply an alternating voltage between the two outer plates, and output connections to each sector of the center plate.

2. A position-type telemeter transmitter comprising three parallel electrically-conducting plates of which the center plate is divided into a plurality of sectors each insulated from the others, a rotatable shaft normal to said plates, at least one dielectric member eccentrically attached to said shaft between an outer plate and the center plate, means to apply an alternating voltage between the two outer plates, and output connections to each sector of the center plate.

3. A telemeter transmitter as in claim 2 in which the center plate is divided into three equal sectors.

4. A telemeter transmitter as in claim 3 in which each sector of the center plate covers an angle of 72 degrees leaving a gap of 48 degrees between adjacent sectors.

5. A position-type telemeter transmitter comprising three parallel electrically-conducting plates of which the center plate is divided into three equal sectors each insulated from the others, the two outer plates being spaced equal distances from the center plate, a rotatable shaft normal to said plates and extending through their centers, two dielectric members eccentrically attached to said shaft between the two outer plates and respectively on opposite sides of the center plate, said eccentrically attached members having their major portions on opposite sides of the axis of said shaft, means to apply an alternating voltage between the two outer plates, and output connections to each sector of the center plate.

6. A telemeter transmitter as in claim 5 in which the dielectric members are shaped substantially according to the polar coordinates equation $r^2 = A \sin \theta + B$.

WILLIAM C. HAHN.

REFERENCES CITED

The following references are of record in the file of this patent:

UNITED STATES PATENTS

| Number | Name | Date |
| --- | --- | --- |
| 2,116,080 | Parker | May 3, 1938 |
| 2,461,832 | Meacham | Feb. 15, 1949 |